(12) United States Patent
Narushima

(10) Patent No.: US 10,768,418 B2
(45) Date of Patent: Sep. 8, 2020

(54) HEAD-UP DISPLAY DEVICE

(71) Applicant: Yazaki Corporation, Tokyo (JP)

(72) Inventor: Noriaki Narushima, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/177,246

(22) Filed: Oct. 31, 2018

(65) Prior Publication Data
US 2019/0129171 A1 May 2, 2019

(30) Foreign Application Priority Data
Nov. 2, 2017 (JP) ................. 2017-212482

(51) Int. Cl.
G02B 27/01 (2006.01)
G02B 27/09 (2006.01)
B60K 35/00 (2006.01)

(52) U.S. Cl.
CPC .......... *G02B 27/0101* (2013.01); *B60K 35/00* (2013.01); *G02B 27/0927* (2013.01); *B60K 2370/1523* (2019.05); *B60K 2370/1529* (2019.05); *B60R 2300/205* (2013.01); *G02B 2027/0118* (2013.01)

(58) Field of Classification Search
CPC ................ G02B 27/01; G02B 27/0101; G02B 27/0172; B60R 2300/205
See application file for complete search history.

(56) References Cited

U.S. PATENT DOCUMENTS

| 2007/0097705 A1* | 5/2007 | Jung ................. G02F 1/133606 362/613 |
| 2011/0075434 A1* | 3/2011 | Kurokawa ......... G02B 27/0101 362/459 |
| 2017/0242246 A1* | 8/2017 | Harada ............... G02B 27/0101 |
| 2018/0321488 A1* | 11/2018 | Usukura .................. G02B 3/06 |

FOREIGN PATENT DOCUMENTS

JP 2016-180922 10/2016

* cited by examiner

*Primary Examiner* — Thanh Nhan P Nguyen
(74) *Attorney, Agent, or Firm* — Kenealy Vaidya LLP

(57) ABSTRACT

A head-up display device has a backlight unit configured to illuminate a liquid crystal panel from a back side. The backlight unit has an optical condenser configured to condense the light emitted from a light source toward the liquid crystal panel, and a microlens array arranged in an optical path between the optical condenser and the liquid crystal panel to diffuse the light condensed by the optical condenser. The microlens array has a light emission face arranged in a position optically conjugated with an eyebox to emit the light incident from the optical condenser.

9 Claims, 5 Drawing Sheets

HEAD-UP DISPLAY DEVICE

CROSS-REFERENCE TO RELATED APPLICATION(S)

The present application claims priority to and incorporates by reference the entire contents of Japanese Patent Application No. 2017-212482 filed in Japan on Nov. 2, 2017.

BACKGROUND OF THE INVENTION

1. Field of the Invention

The present invention relates to a head-up display device.

2. Description of the Related Art

There is known a head-up display device mounted on a vehicle to project a display image on a windshield and display a virtual image in front of a windshield. In such a head-up display device, luminance inconsistency is suppressed by using a backlight unit having a diffuser sheet or the like arranged in a position corresponding to an entrance pupil of an optical system. For example, Japanese Patent Application Laid-open No. 2016-180922 discusses a head-up display device capable of providing a constant luminance distribution on a surface of a liquid crystal panel as seen from an eyebox by arranging a light emission face of a diffuser sheet in a position conjugated with a surface of the eyebox.

In the head-up display device known in the related art, light beams reflected on surfaces of the windshield having different reflectance are incident to the eyebox. Therefore, it is perceived that brightness of the presentation image projected onto the windshield is changed by a vertical movement of a driver's viewpoint. Therefore, there is a demand for improvement.

SUMMARY OF THE INVENTION

An object of the present invention is to provide a head-up display device capable of suppressing a change of the brightness in the display image caused by a movement of the driver's viewpoint.

A head-up display device according to one aspect of the present invention includes a display that emits a display light corresponding to a display image, the head-up display device allowing a driver to visually recognize a virtual image displayed in front of a display member depending on the display image in a driver's visible area in a vehicle by projecting the display image displayed on the display onto the display member through an optical system of the vehicle, wherein the display has a transmission type liquid-crystal display element, and a backlight unit that illuminates the liquid-crystal display element from a back side thereof, the backlight unit has a single light source, an optical condenser that condenses light emitted from the light source toward the liquid-crystal display element, and an optical member arranged in an optical path between the optical condenser and the liquid-crystal display element to diffuse the light condensed by the optical condenser, the optical member has a light emission face arranged in a position optically conjugated with the visible area to emit the light incident from the optical condenser, and the optical condenser is formed to be able to adjust illuminance of light emitted from the light emission face in a vertical direction of the light emission face in order to provide a constant luminance distribution in the vertical direction of the visible area.

According to another aspect of the present invention, in the head-up display device, it is preferable that the optical condenser has a lens face which is a convex free curved surface and is formed asymmetrically in the vertical direction, and is formed such that an optical length from the light source to the curved surface is shortened by reducing a curvature of the lens face corresponding to a position for decreasing illuminance of the light emission face in order to decrease the illuminance of the light emission face in a side optically conjugated with an upper side in the vertical direction of the visible area.

According to still another aspect of the present invention, in the head-up display device, it is preferable that the optical condenser has a lens face which is a convex free curved surface and is formed asymmetrically in the vertical direction, and is formed such that an optical length from the light source to the curved surface is lengthened by increasing a curvature of the lens face corresponding to a position for increasing illuminance of the light emission face in order to increase the illuminance of the light emission face in a side optically conjugated with a lower side in the vertical direction of the visible area.

According to still another aspect of the present invention, in the head-up display device, it is preferable that the optical condenser is an optical condensing lens having an incident face concaved toward a side of the light source, and a light emission face formed at a side of the optical member and emitting the light incident from the incident face to diffuse in a direction separated from an optical axis direction, and is formed such that the incident face has a center axis positioned in a lower side of the vertical direction of the light emission face.

According to still another aspect of the present invention, in the head-up display device, it is preferable that the optical member has a plurality of microlenses arranged in a grid shape, and each of the microlenses has a lens face which is a convex or concave curved surface.

A head-up display device according to still another aspect of the present invention includes a display that emits a display light corresponding to a display image, the head-up display device allowing a driver to visually recognize a virtual image displayed in front of a display member depending on the display image in a driver's visible area in a vehicle by projecting the display image displayed on the display onto the display member through an optical system of the vehicle, wherein the display has a transmission type liquid-crystal display element, and a backlight unit that illuminates the liquid-crystal display element from a back side thereof, the backlight unit has a single light source, an optical condenser that condenses light emitted from the light source toward the liquid-crystal display element, and a diffuser arranged in an optical path between the optical condenser and the liquid-crystal display element to diffuse the light condensed by the optical condenser, and the diffuser has a light emission face arranged in a position optically conjugated with the visible area to emit the light incident from the optical condenser, and is arranged with an inclination against an optical axis direction of the light emission face in order to provide a constant luminance distribution in a vertical direction of the visible area.

The above and other objects, features, advantages and technical and industrial significance of this invention will be better understood by reading the following detailed descrip-

DETAILED DESCRIPTION OF THE PREFERRED EMBODIMENTS

An embodiment according to a head-up display device of the invention will now be described in details with reference to the accompanying drawings. Note that the invention is not limited by such embodiments. In addition, elements of the embodiment described below include those easily anticipatable by a person ordinarily skilled in the art or substantial equivalents thereof. Furthermore, for the elements of the embodiment described below, various omissions, substitutions, or changes may be possible without departing from the spirit and scope of the invention. Note that the configurations described below may be appropriately combined.

Embodiment

Figure 1:
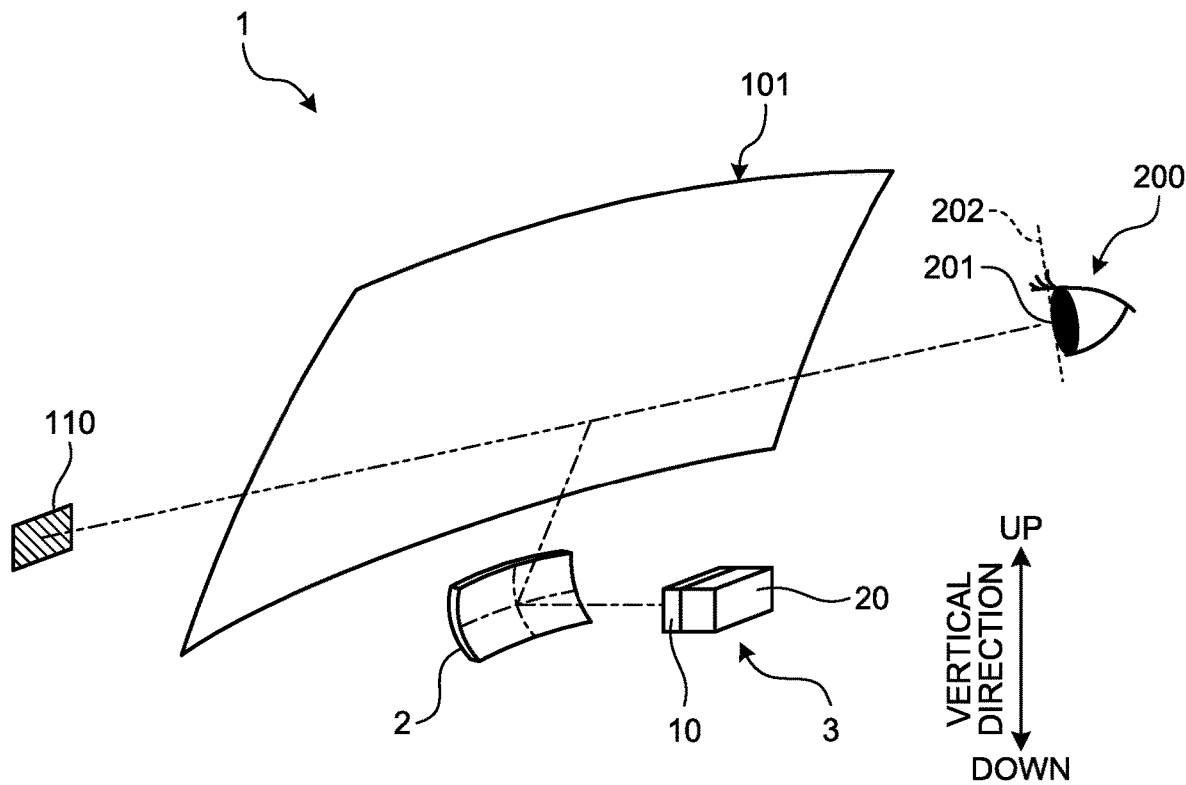
FIG. 1 is a schematic diagram illustrating a head-up display device according to an embodiment.
Figure 2:
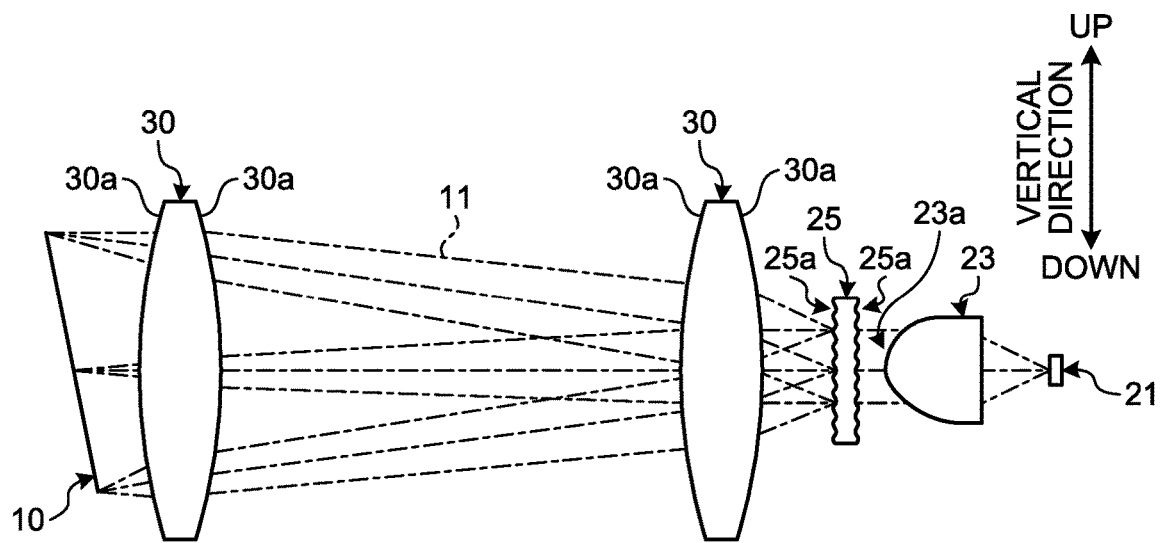
FIG. 2 is a schematic diagram illustrating a backlight unit according to an embodiment.
Figure 3:
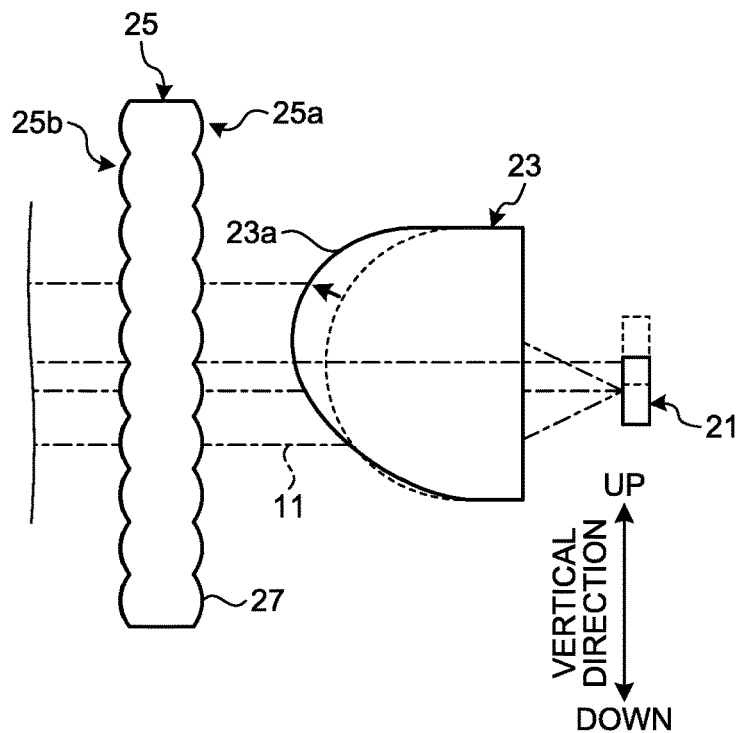
FIG. 3 is a schematic diagram illustrating an optical condenser according to an embodiment.
Figure 4:
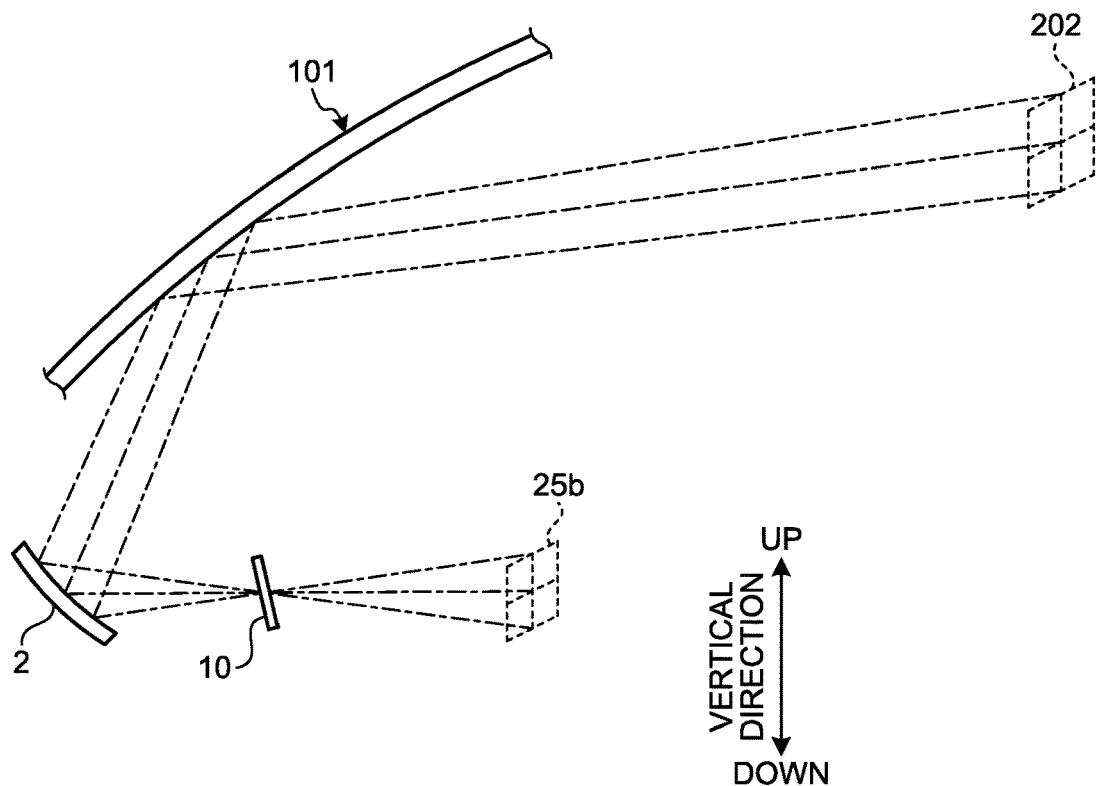
FIG. 4 is a schematic diagram illustrating a conjugate relationship between a light emission face of a microlens array and an eyebox according to an embodiment.
Figure 5:
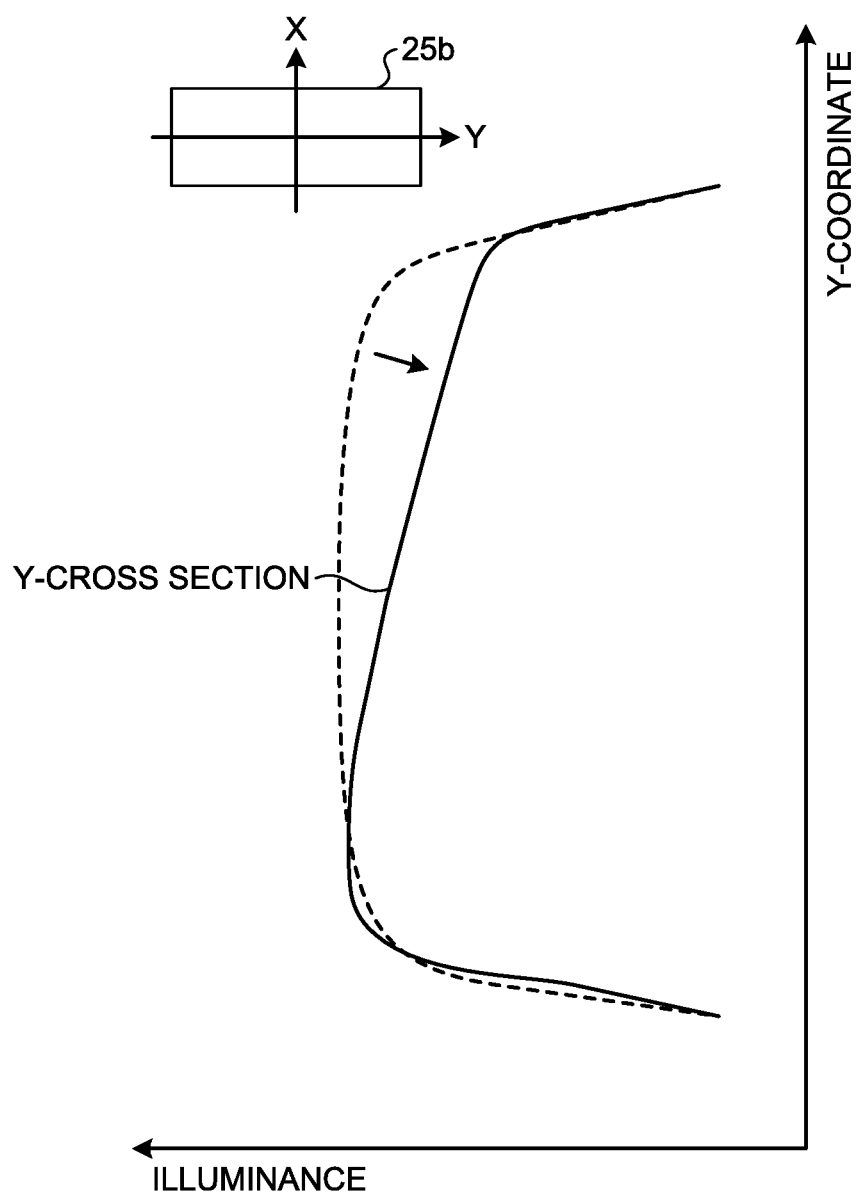
FIG. 5 is a diagram for describing a secondary light source surface illuminance distribution according to an embodiment.
Figure 6:
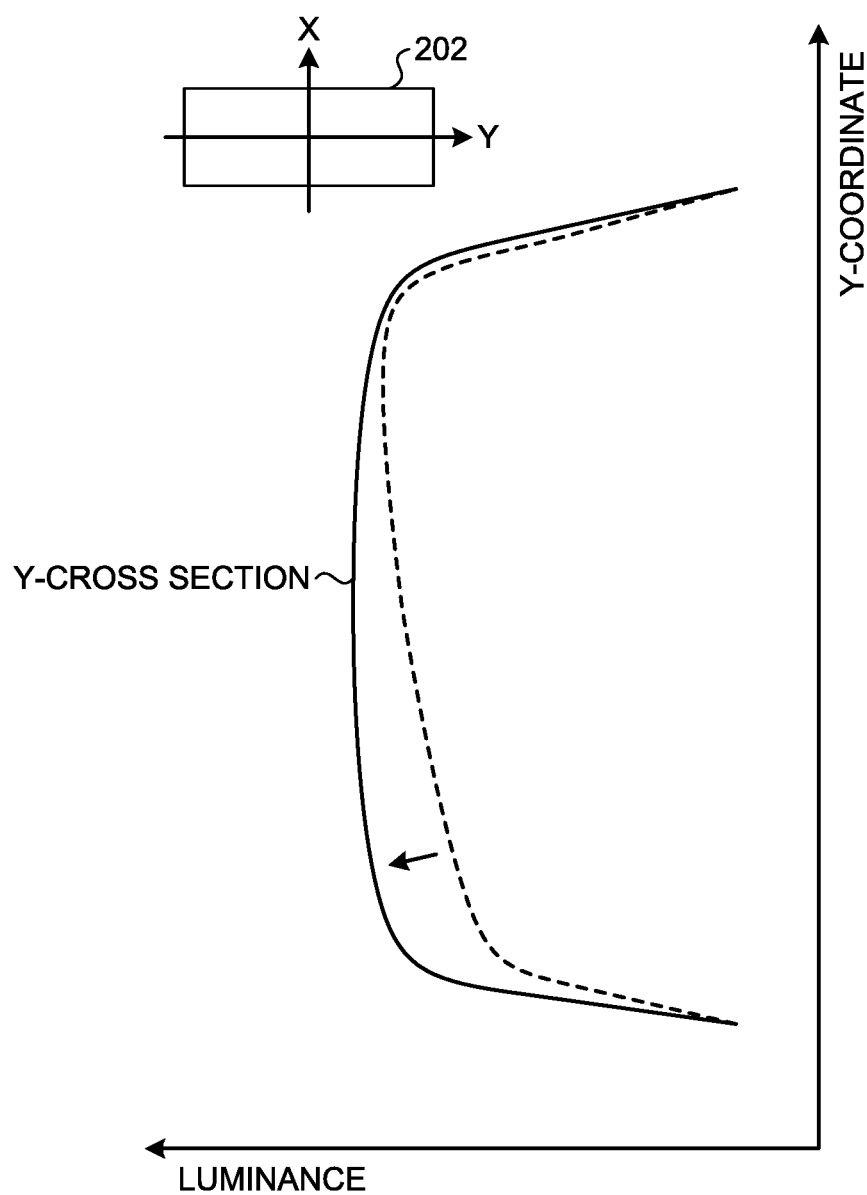
FIG. 6 is a diagram for describing a luminance distribution of the eyebox according to an embodiment.

FIG. 1 is a schematic diagram illustrating a head-up display device according to an embodiment of the invention. FIG. 2 is a schematic diagram illustrating a backlight unit according to an embodiment of the invention. FIG. 3 is a schematic diagram illustrating an optical condenser according to an embodiment of the invention. FIG. 4 is a schematic diagram illustrating a conjugate relationship between a light emission face of a microlens array and an eyebox according to an embodiment of the invention. FIG. 5 is a diagram for describing a secondary light source surface illuminance distribution according to an embodiment of the invention. FIG. 6 is a diagram for describing a luminance distribution of the eyebox according to an embodiment of the invention. Note that FIG. 2 illustrates a positional relationship of each element as the backlight unit is seen from a lateral side. Here, vertical directions of FIGS. 1 to 4 refer to vertical directions of the head-up display device and the backlight unit according this embodiment, in which upper and lower directions refer to upper and lower sides, respectively (this similarly applies to FIGS. 7 and 8).

The head-up display device 1 according to this embodiment is arranged in the inside of a dashboard (not illustrated) of a vehicle (not illustrated) such as an automobile. The head-up display device 1 allows a driver 200 to visually recognize a virtual image 110 displayed in front of a windshield 101 depending on a display image in an eyebox 202 of the driver 200 by projecting the display image on the windshield 101 through a magnification mirror 2 as illustrated in FIG. 1. The eyebox 202 is a visible area for allowing the driver 200 in the vehicle to visually recognize the virtual image 110. The eyebox 202 includes an eye point 201. The eye point 201 is a viewpoint position of the driver 200 who seats on a driver's seat (not illustrated). The driver 200 recognizes an image reflected on the windshield 101 serving as a display member as the virtual image 110. The virtual image 110 is displayed in front of the windshield 101 depending on the display image. The head-up display device 1 has a magnification mirror 2 and a display unit 3. The magnification mirror 2 is an optical system of the vehicle to reflect the display image displayed on the display unit 3 toward the windshield 101. The magnification mirror 2 is, for example, an aspheric mirror. The display unit 3 is a display that emits display light corresponding to the display image. The display unit 3 has a liquid crystal panel 10 and a backlight unit 20.

The liquid crystal panel 10 is a liquid-crystal display element. The liquid crystal panel 10 includes, for example, a transmission type or a semi-transmissive type thin film transistor (TFT) liquid crystal display or the like. In the liquid crystal panel 10, the display surface of the front surface side emits light as it is illuminated from the back side. The liquid crystal panel 10 displays a display image including numerals, characters, figures, and the like in response to a control command from a control unit (not illustrated) mounted on the vehicle. The liquid crystal panel 10 is driven by AC power obtained from the vehicle side.

The backlight unit 20 illuminates the liquid crystal panel 10 from the back side. The backlight unit 20 is driven by DC power obtained from a power source (not illustrated) of the vehicle. As illustrated in FIG. 2, the backlight unit 20 has a light source 21, an optical condenser 23, a microlens array 25, and two optical condensing lenses 30. The light source 21, the optical condenser 23, the microlens array 25, and the optical condensing lenses 30 are arranged along an optical axis direction of the light emitted from the light source 21.

The light source 21 has a single light emitting diode (LED) module. The light source 21 is driven by DC power obtained from a power source (not illustrated) of the vehicle. The light source 21 is turned on or off in response to an ON/OFF signal from the control unit. The light source 21 is fixed to, for example, a panel (not illustrated) or the like. The panel may have a heat sink (not illustrated) fixed to the back side. The heat sink radiates the heat accumulated in the panel to the outside of the backlight unit 20.

The optical condenser 23 is, for example, an optical condensing lens for condensing the light emitted from the light source 21 toward the liquid crystal panel 10. The optical condenser 23 includes glass, transparent resin, and the like. As illustrated in FIG. 3, the optical condenser 23 has a lens face 23a which is a convex free curved surface and is formed asymmetrically in the vertical direction. The optical condenser 23 emits, from the lens face 23a, only the light reaching an emission range of the lens face 23a out of light incident from the light source 21.

The microlens array 25 is an optical member. The microlens array 25 is formed of, for example, glass, transparent resin, and the like. As illustrated in FIG. 2, the microlens array 25 is arranged in an optical path between the optical condenser 23 and the liquid crystal panel 10 to diffuse the light condensed by the optical condenser 23. As illustrated in FIG. 3, the microlens array 25 has an incident face 25a where the light 11 condensed by the optical condenser 23 is incident, and a light emission face 25b where the light 11 incident from the incident face 25a is emitted. The microlens array 25 has a plurality of microlenses 27. The microlens array 25 has a so-called fly-eye lens face. A plurality of microlenses 27 are arranged in a grid shape. Each microlens 27 has a convex curved surface. The microlens 27 according to this embodiment has a convex and partially spherical surface.

The two optical condensing lenses 30 are arranged in an optical path between the microlens array 25 and the liquid crystal panel 10. Each of the optical condensing lenses 30 is formed of a high refractive material such as glass or transparent resin and has a pair of lens faces 30a. The lens face 30a is a curved surface including a hemispheric surface, and is formed to be normal to the optical axis direction. One lens face 30a is provided for each of the incident face and the light emission face of the light 11. The optical condensing lenses 30 function to establish an optical conjugate relationship between the eyebox 202 and the light emission face 25b of the microlens array 25 and refract the light 11 directed to the outside of the liquid crystal panel 10 to condense the light 11 toward the liquid crystal panel 10.

Next, functional effects of the backlight unit 20 according to this embodiment will be described with reference to FIG. 2. First, the light 11 emitted from the light source 21 is incident to the optical condenser 23 as illustrated in FIG. 2. The light 11 incident to the optical condenser 23 transmits the inside and is emitted from the lens face 23a. The light 11 emitted from the lens face 23a is condensed onto the microlens array 25. The light 11 condensed by the optical condenser 23 and incident to the microlens array 25 may have any form such as parallel light, diverging light, or converging light. The light 11 incident to the incident face 25a of the microlens array 25 transmits the inside and is emitted to the optical condensing lenses 30 in the front stage from the light emission face 25b. In the microlens 27, preferably, the shape of the convex curved surface is determined such that the incident light irradiates the optical condensing lenses 30. The light transmitting through the optical condensing lenses 30 in the front stage transmits the optical condensing lenses 30 of the rear stage and irradiates the entire surface of the back side of the liquid crystal panel 10.

Next, functional effects of the head-up display device 1 according to this embodiment will be described with reference to FIGS. 4 to 6. In FIG. 4, the light emitted from the light emission face 25b of the microlens array 25 is condensed onto the liquid crystal panel 10 by an optical system of the backlight unit 20. The light condensed onto the liquid crystal panel 10 transmits through the inside and is directed to the magnification mirror 2. The light incident to the magnification mirror 2 is reflected to the windshield 101. The light reflected on the windshield 101 is incident to the eyebox 202. Since the microlens array 25 according to this embodiment includes a plurality of microlenses 27, a light source image is formed by the light incident to each microlens 27. The light emission face 25b on which a plurality of light source images are formed serves as a secondary light source of the backlight unit 20. Since the light emission face 25b is arranged in a position optically conjugated with the eyebox 202, a luminance distribution of the eyebox 202 is changed depending on a change of the illuminance distribution of the light emission face 25b (herein, referred to as a "secondary light source surface illuminance distribution"). For example, even when the secondary light source surface illuminance distribution is constant on the Y-coordinate as indicated by the dashed line in the graph of FIG. 5, the luminance distribution of the eyebox 202 is not constant on the Y-coordinate as indicated by the dashed line in the graph of FIG. 6. Therefore, the brightness of the display image is recognized to change vertically depending on a vertical movement of the eye point 201. According to this embodiment, the secondary light source surface illuminance distribution is changed such that the luminance distribution of the eyebox 202 becomes constant on the Y-coordinate as indicated by the solid line in the graph of FIG. 6. According to this embodiment, by forming the lens face 23a of the optical condenser 23 asymmetrically in the vertical direction, a gradient of the secondary light source surface illuminance distribution is set to be opposite to gradient of the luminance distribution of the eyebox 202 as indicated by the solid line in the graph of FIG. 5. For example, an optical length from the light source 21 to the curved surface is shortened by reducing a curvature of the lens face 23a corresponding to a position for decreasing the illuminance of the light emission face 25b in order to decrease the illuminance of the light emission face 25b in the side conjugated with the upper side in the vertical direction of the eyebox 202. As a result, the secondary light source surface illuminance distribution has a gradient indicated by the solid line in FIG. 5, and the luminance distribution of the eyebox 202 has a gradient indicated by the solid line in FIG. 6. Alternatively, the optical length from the light source 21 to the curved surface may be lengthened by increasing the curvature of the lens face 23a corresponding to a position for increasing the illuminance of the light emission face 25b in order to increase the illuminance of the light emission face 25b in the side conjugated with the lower side in the vertical direction of the eyebox 202.

As described above, the head-up display device 1 according to this embodiment allows the driver 200 to visually recognize the virtual image 110 displayed in front of the windshield 101 depending on the display image by projecting the display image displayed on the display unit 3 onto the windshield 101 through the magnification mirror 2 using the eyebox 202 of the driver 200. The display unit 3 has the liquid crystal panel 10 and the backlight unit 20. The backlight unit 20 has an optical condenser 23 configured to condense the light emitted from the light source 21 toward the liquid crystal panel 10, and the microlens array 25 arranged in the optical path between the optical condenser 23 and the liquid crystal panel 10 to diffuse the light condensed by the optical condenser 23. The microlens array 25 has the light emission face 25b arranged in a position optically conjugated with the eyebox 202 to emit the light incident from the optical condenser 23. The optical condenser 23 is formed to be adjustable the illuminance of the light emitted from the light emission face 25b in the vertical direction of the light emission face 25b such that the vertical luminance distribution of the eyebox 202 becomes constant.

In the head-up display device 1 having the aforementioned configuration, the illuminance distribution of the light emission face 25b (secondary light source surface) of the microlens array 25 has a gradient opposite to the gradient of the luminance distribution of the eyebox 202. As a result, it is possible to provide a constant luminance distribution of the eyebox 202 and suppress a change of the brightness of the display image caused by a movement of the driver's viewpoint. In addition, since the illuminance distribution of the light emission face 25b of the microlens array 25 is changed by changing the shape of the lens face 23b of the optical condenser 23, it is possible to lower the cost.

In the head-up display device 1 according to this embodiment, the optical condenser 23 has the lens face 23a which is a convex free curved surface and is formed asymmetrically in the vertical direction. The optical condenser 23 is formed to shorten the optical length from the light source 21 to the curved surface by reducing the curvature of the lens face 23a corresponding to a position for decreasing the illuminance of the light emission face 25b in order to decrease the illuminance of the light emission face 25b in the side conjugated with the upper side in the vertical direction of the eyebox 202. In addition, the optical condenser 23 is formed to lengthen the optical length from the light source 21 to the curved surface by increasing the curvature of the lens face 23a corresponding to a position for increasing the illuminance of the light emission face 25b in order to increase the illuminance of the light emission face 25b in the side conjugated with the lower side in the vertical direction of the eyebox 202. Using the aforementioned configuration, it is possible to easily change the luminance distribution in the vertical direction of the eyebox 202.

In the head-up display device 1 according to this embodiment, a plurality of microlenses 27 of the microlens array 25 are arranged in a grid shape. Each microlens 27 has a lens face as the convex curved surface. In this manner, it is possible to form a plurality of light source images as the secondary light source using the microlens array 25 and illuminate the entire surface of the liquid crystal panel 10 using each light source image. As a result, it is possible to suppress luminance inconsistency in the liquid crystal panel 10. In addition, since a plurality of light source images are formed, it is not necessary to provide a plurality of light sources 21. Therefore, it is possible to lower the cost by reducing the number of components and reduce the power consumption.

First Modification

Figure 7:
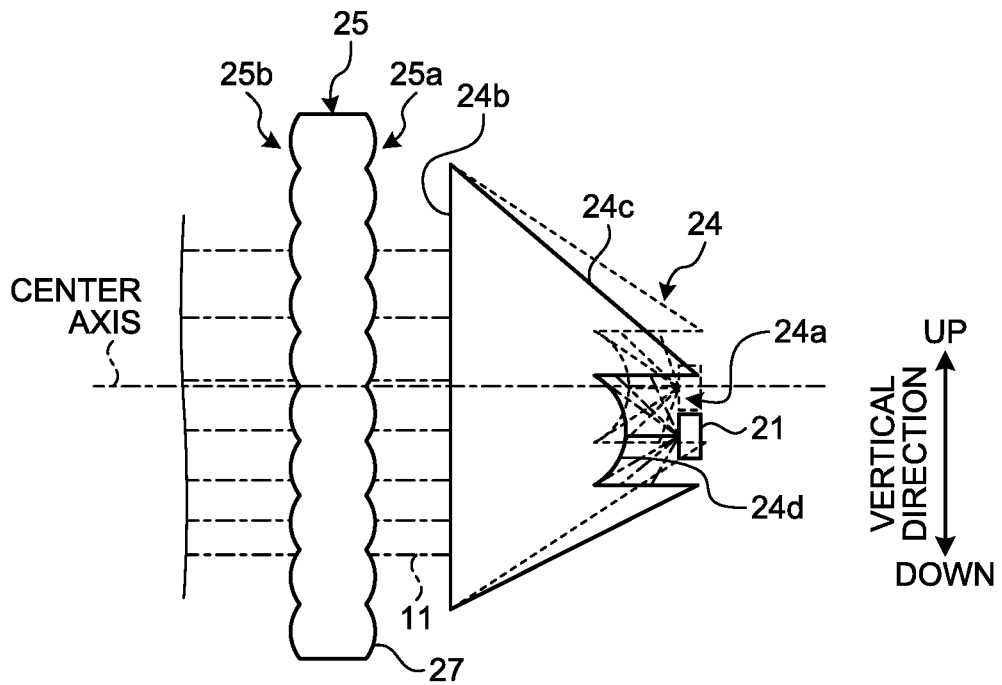
FIG. 7 is a schematic diagram illustrating an optical condenser according to a first modification of the embodiment.

Although the optical condenser 23 includes the optical condensing lens having the lens face 23a which is a convex free curved surface and is formed asymmetrically in the vertical direction in the aforementioned embodiment, the invention is not limited thereto. FIG. 7 is a schematic diagram illustrating an optical condenser according to a first modification of the embodiment. The optical condenser 24 is, for example, an LED condensing lens. The optical condenser 24 includes an incident face 24a, a light emission face 24b, a pair of total reflection faces 24c, and a lens face 24d. The incident face 24a is a portion formed to be concave toward the light source 21 side to receive the light incident from the light source 21. The incident face 24a has a lens face 24d having a convex curved surface. The light emission face 24b is a portion provided in the microlens array 25 side to emit the light incident from the incident face 24a to diffuse in a direction separated from the optical axis direction. The total reflection face 24c is a portion widened to a direction separated from the optical axis direction and directed from the light source 21 toward the microlens array 25 to totally reflect the light incident by transmitting through the inside of the optical condenser 24. The optical condenser 24 is formed such that the incident face 24a has a center axis positioned in the lower side in the vertical direction of the light emission face 25b. Note that the optical condenser 24 indicated by the dashed line in the drawings is formed such that the vertical center axis of the incident face 24a matches the vertical center axis of the light emission face 25b.

As the light 11 incident to the optical condenser 24 enters the inside from the incident face 24a, the light 11 is partially reflected on the total reflection face 24c and is emitted from the light emission face 24b. The optical condenser 24 according to this embodiment is formed such that the incident face 24a has a center axis positioned in the lower side in the vertical direction of the light emission face 24b. For this reason, the illuminance of the light reflected on the upper total reflection face 24c in the vertical direction and emitted from the light emission face 24b is different from the illuminance of the light reflected on the lower total reflection face 24c and emitted from the light emission face 24b. As a result, according to the first modification of the embodiment, the incident face 24a of the optical condenser 24 has a center axis positioned in the lower side in the vertical direction of the light emission face 25b. Therefore, it is possible to achieve all of the functional effects of the aforementioned embodiment and manufacture the head-up display device with low cost.

Second Modification

Figure 8:
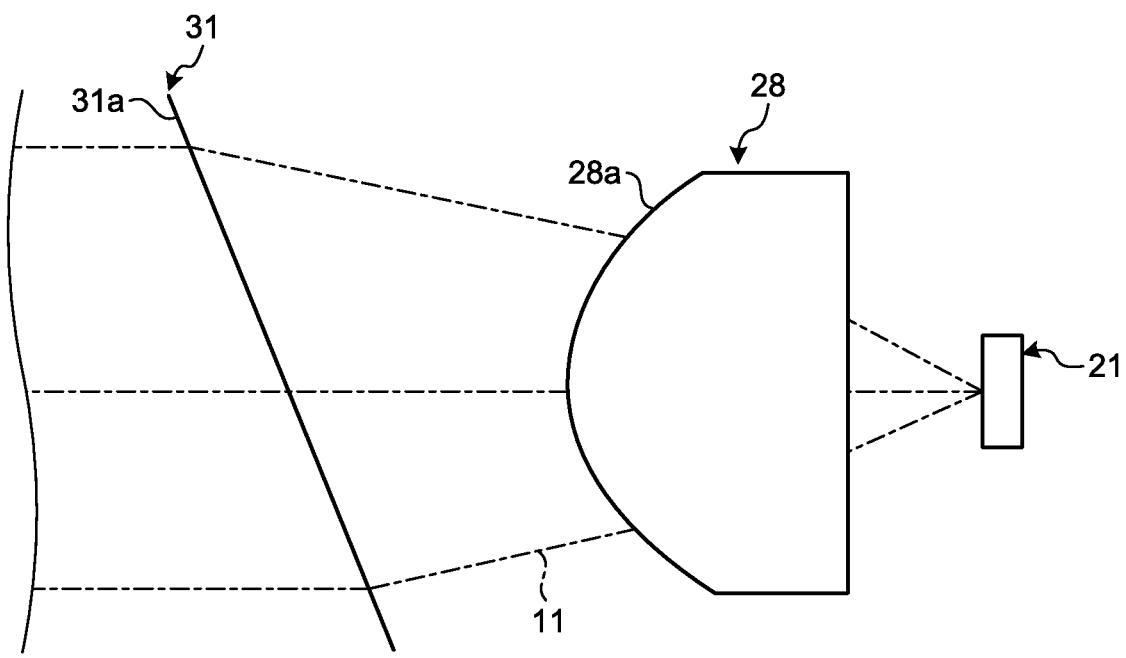
FIG. 8 is a schematic diagram illustrating a diffuser according to a second modification of the embodiment.

Although the optical condenser 23 has the lens face formed asymmetrically in the vertical direction, and the optical condenser 23 and the microlens array 25 are combined with each other in the aforementioned embodiment, the invention is not limited thereto. FIG. 8 is a schematic diagram illustrating a diffuser according to a second modification of the embodiment. The optical condenser 28 has a lens face 28a which is a convex free curved surface and is formed asymmetrically in the vertical direction. The optical condenser 28 condenses the light emitted from the light source 21 toward the liquid crystal panel 10. The diffuser 31 is arranged in the optical path between the optical condenser 28 and the liquid crystal panel 10 to diffuse the light condensed by the optical condenser 28. The diffuser 31 diffuses the light 11 incident from the optical condenser 28 toward the liquid crystal panel 10 side. The diffuser 31 is formed, for example, in a sheet shape or a thin plate shape. The diffuser 31 according to this embodiment has a light emission face 31a arranged in a position optically conjugated with the eyebox 202 to emit the light incident from the optical condenser 28. The diffuser 31 is arranged with an inclination against the optical axis direction of the light emission face 31a in order to provide a constant vertical luminance distribution of the eyebox 202.

The light emitted from the optical condenser 28 irradiates the diffuser 31. Since the light emission face 31a of the diffuser 31 is arranged with an inclination against the optical axis direction, an optical length from the light source 21 to the diffuser 31 become unsymmetrical in the vertical direction, and the illuminance distribution of the light emission face 31a has a gradient indicated by the solid line in FIG. 5. As a result, the luminance distribution of the eyebox 202 optically conjugated with the light emission face 31a has a gradient indicated by the solid line in FIG. 6. Therefore, it is possible to achieve the same functional effects as those of the aforementioned embodiment. In addition, since the diffuser 31 is slanted, it is possible to change the gradient of the illuminance distribution of the light emission face 31a. Therefore, it is possible to reduce a manufacturing cost or a component cost regardless of a component fabrication cost or a mold cost.

Although the microlens array 25 is formed of glass or transparent resin in the aforementioned embodiment, the invention is not limited thereto. Various types of adjustable lenses such as a liquid crystal lens, a liquid lens, a membrane lens, and an electro-wetting lens may be employed.

Although the light source 21 has a single light-emitting diode in the embodiment and the modifications described above, the invention is not limited thereto. For example, the light source 21 may have a light source module having a plurality of light-emitting diodes.

Although the microlens 27 has a rectangular shape in the embodiment and the modifications described above, the invention is not limited thereto. The microlens 27 may have a square shape, a circular shape, or a hexagonal shape. In addition, although the microlens 27 has a convex curved surface, the invention is not limited thereto. The microlens 27 may have a concave curved surface.

Although the diffuser is not arranged immediately before the incidence side of the liquid crystal panel 10 in the embodiment and the modifications described above, the diffuser may be arranged in parallel with the plane of the liquid crystal panel 10.

Although the magnification mirror 2 projects the display image displayed on the display unit 3 toward the windshield 101 in the embodiment and the modifications described above, the invention is not limited thereto. The display image may be projected using a combination optical system combined with a plurality of magnification mirrors or a plane mirror.

In the embodiment and the modifications described above, as a component for diffusing the light, the diffuser 31 may diffuse the light by roughening the surface of the light emission face 31a or incorporating light diffusion particles into the inside of the diffuser 31.

Although the display image is projected to the windshield 101 in the embodiment and the modifications described above, the invention is not limited thereto. For example, the display image may be projected to a combiner or the like.

Although the head-up display device 1 is applied to a vehicle in the embodiment and the modifications described above, the invention is not limited thereto. The head-up display device 1 may be applied to other transportation units such as a vessel and an airplane.

Using the head-up display device according to the present embodiments, an effect is exhibited in which a change of the brightness in the display image caused by a movement of the driver's viewpoint can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device comprising:
   a display that emits a display light corresponding to a display image, the head-up display device allowing a driver to visually recognize a virtual image displayed in front of a display member depending on the display image in a driver's visible area in a vehicle by projecting the display image displayed on the display onto the display member through an optical system of the vehicle, wherein
   the display has a transmission type liquid-crystal display element, and a backlight unit that illuminates the liquid-crystal display element from a back side thereof,
   the backlight unit has a single light source, an optical condenser that condenses light emitted from the light source toward the liquid-crystal display element, and an optical member arranged in an optical path between the optical condenser and the liquid-crystal display element to diffuse the light condensed by the optical condenser,
   the optical member has a light emission face arranged in a position optically conjugated with the visible area to emit the light incident from the optical condenser, and
   the light emission face has a center axis, and
   the optical condenser is asymmetric with respect to the center axis such that illuminance distribution of light emitted from the light emission face varies in a vertical direction of the light emission face in order to provide a constant luminance distribution in the vertical direction of the visible area, and has a single lens face which is a convex free curved surface.

2. The head-up display device according to claim 1, wherein
   the optical condenser is formed such that an optical length from the light source to the curved surface is shortened by reducing a curvature of the lens face corresponding to a position for decreasing illuminance of the light emission face in order to decrease the illuminance of the light emission face in a side optically conjugated with an upper side in the vertical direction of the visible area.

3. The head-up display device according to claim 1, wherein
   the optical condenser is formed such that an optical length from the light source to the curved surface is lengthened by increasing a curvature of the lens face corresponding to a position for increasing illuminance of the light emission face in order to increase the illuminance of the light emission face in a side optically conjugated with a lower side in the vertical direction of the visible area.

4. The head-up display device according to claim 1, wherein
   the optical condenser is an optical condensing lens having an incident face concaved toward a side of the light source, and a light emission face formed at a side of the optical member and emitting the light incident from the incident face to diffuse in a direction separated from an optical axis direction, and is formed such that the incident face has a center axis positioned in a lower side of the vertical direction of the light emission face.

5. The head-up display device according to claim 1, wherein
   the optical member has a plurality of microlenses arranged in a grid shape, and
   each of the microlenses has a lens face which is a convex or concave curved surface.

6. The head-up display device according to claim 2, wherein
   the optical member has a plurality of microlenses arranged in a grid shape, and
   each of the microlenses has a lens face which is a convex or concave curved surface.

7. The head-up display device according to claim 3, wherein
   the optical member has a plurality of microlenses arranged in a grid shape, and
   each of the microlenses has a lens face which is a convex or concave curved surface.

8. The head-up display device according to claim 4, wherein
   the optical member has a plurality of microlenses arranged in a grid shape, and
   each of the microlenses has a lens face which is a convex or concave curved surface.

9. A head-up display device comprising:
   a display that emits a display light corresponding to a display image, the head-up display device allowing a driver to visually recognize a virtual image displayed in front of a display member depending on the display image in a driver's visible area in a vehicle by projecting the display image displayed on the display onto the display member through an optical system of the vehicle, wherein the display has a transmission type liquid-crystal display element, and a backlight unit that illuminates the liquid-crystal display element from a back side thereof, the backlight unit has a single light source, an optical condenser that condenses light emitted from the light source toward the liquid-crystal display element, and a diffuser arranged in an optical path between the optical condenser and the liquid-crystal display element to diffuse the light condensed by the optical condenser, and the diffuser has a light emission face arranged in a position optically conjugated with the visible area to emit the light incident from the optical condenser, and is arranged with an inclination against an optical axis direction of the light emission face such that illuminance distribution of light emitted from the light emission face varies in a vertical direction in order to provide a constant luminance distribution in a vertical direction of the visible area.

\* \* \* \* \*